UNITED STATES PATENT OFFICE.

JOSEPH C. HECKMAN, OF AVALON BOROUGH, PENNSYLVANIA.

PROCESS AND SUBSTANCE FOR PURIFYING GAS.

1,154,858.

Specification of Letters Patent. Patented Sept. 28, 1915.

No Drawing. Application filed March 2, 1915. Serial No. 11,649.

*To all whom it may concern:*

Be it known that I, JOSEPH C. HECKMAN, citizen of the United States, and residing in the borough of Avalon, in the county of Allegheny and State of Pennsylvania, have invented or discovered new and useful Improvements in Processes and Substances for Purifying Gas, of which the following is a specification.

My invention relates to a substance for the purification of illuminating gas.

Illuminating gas as it comes from the producer contains sulfur in the form of sulfureted hydrogen which must be removed before the gas is fit for use. In the present practice, this purification is accomplished by passing the gas through a colloidal mass formed by mixing a vegetable fluffing material, such as wood, shavings, saw-dust, or corn-cobs with material which has an affinity for the sulfur. Such a mass is open to numerous objections. For instance, it is subject to spontaneous combustion, and again, when the virtue of the purifying material is exhausted, the residuum which contains valuable elements, is practically worthless, owing to the contaminations produced by the vegetable fluffing material. The vegetable fluffing material rapidly becomes saturated with impurities rendering it soggy and devoid of fluffing efficiency.

The object of my invention is to overcome these objections and to these ends, I employ "granulated" blast-furnace slag as a fluffing material. By granulated coated blast-furnace slag, I mean that produced by running the molten-slag, as it comes from the furnace into water forming a vesicular, brittle, friable and pumice-like mass. This fluffing base is preferably in lumps or particles of less than one inch in diameter, and is thoroughly mixed with the purifying material which may be of any character, having an affinity for sulfur, such, for instance, as hydrated oxid of iron, sufficient water being added to the mixture to produce a colloidal adherent mass. This colloidal mass is loaded into the gas-boxes in the usual manner and the gas permitted to filter through the same.

The advantages attendant upon using such a fluffing material are manifold.

The mixture is of vastly greater purifying capacity than that used in the present practice, therefore, a much greater volume of gas may be filtered with the same quantity of material than has heretofore been possible, thereby cheapening the cost of gas production. Again, the fluffing material does not become soggy, or lose its fluffing qualities. This "granulated" slag is at present practically a waste product and therefore can be obtained at a minimum cost in limited quantities. It is non-combustible and therefore, the danger of fire is avoided.

The sulfur deposited by the gas forms with the slag sulfur pyrites of great commercial value, and after the substance has been "fouled" until it has practically lost its capacity to take up the sulfur from the gas, the sulfuric acid may be recovered and the residue, which consists of oxid of iron may be returned to the blast furnace to be used again.

What I claim is:

1. A filtering material for gas, consisting of a colloidal mass containing "granulated" blast-furnace slag as a fluffing material mixed with a substance having an affinity for sulfur.

2. A filtering material for gas consisting of a colloidal mass containing "granulated" blast-furnace slag as a fluffing material mixed with hydrated oxid of iron.

Signed at Pittsburgh, Pa., this 1st day of March, 1915.

JOSEPH C. HECKMAN.

Witnesses:
E. G. LAWRENCE,
SYLVESTER D. SNEE.